United States Patent [19]

Himeno et al.

[11] Patent Number: 5,595,575
[45] Date of Patent: Jan. 21, 1997

[54] BLUE DISPERSE DYE MIXTURE

[75] Inventors: Kiyoshi Himeno; Toshio Hihara; Ryouichi Sekioka, all of Kitakyushu, Japan

[73] Assignee: DyStar Japan Ltd., Osaka, Japan

[21] Appl. No.: 555,171

[22] Filed: Nov. 8, 1995

[30] Foreign Application Priority Data

Dec. 2, 1994 [JP] Japan .................................. 6-323965

[51] Int. Cl.$^6$ .............................. C09B 67/22; D06P 3/54
[52] U.S. Cl. .................. 8/639; 8/662; 8/691; 8/696; 8/922
[58] Field of Search .............................. 8/639, 691, 696, 8/662, 922

[56] References Cited

FOREIGN PATENT DOCUMENTS

| 0347685 | 12/1989 | European Pat. Off. . |
| 0392358 | 10/1990 | European Pat. Off. . |
| 3317930 | 11/1983 | Germany . |
| 4304744 | 8/1994 | Germany . |
| 59-96167 | 6/1984 | Japan . |
| 60-239291 | 11/1985 | Japan . |

*Primary Examiner*—Margaret Einsmann
*Attorney, Agent, or Firm*—Oblon, Spivak, McClelland, Maier & Neustadt, P.C.

[57] ABSTRACT

A blue disperse dye mixture comprising a monoazo dye of the following formula (1) and at least one azo dye selected from the group consisting of dyes of the following formulas (2), (3), (4) and (5):

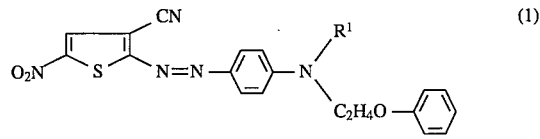

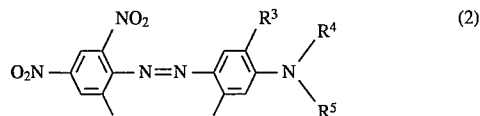

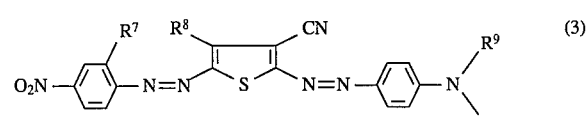

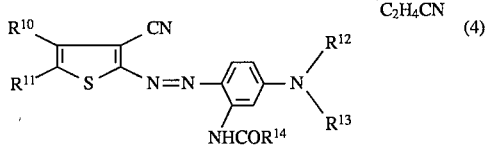

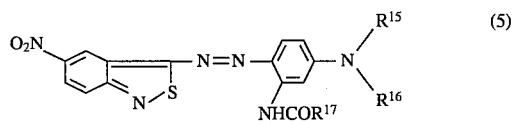

wherein each of the variables is defined in the specification.

5 Claims, No Drawings

BLUE DISPERSE DYE MIXTURE

The present invention relates to a disperse dye mixture. Particularly, it relates to a blue disperse dye mixture which is particularly excellent in the pH dependency and has an improved color rendering property and which is excellent in the build up property and the temperature dependency in dyeing.

A monoazo dye of the following formula (1) is excellent in the pH dependency, but its color rendering property is inadequate. On the other hand, the build up property and the temperature dependency in dyeing are also required to be improved especially in the field of dyeing with a medium to deep color.

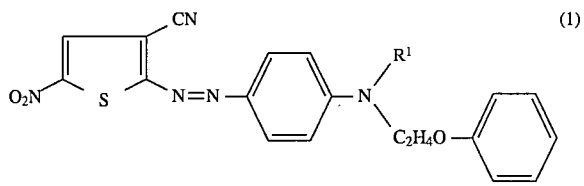
(1)

wherein $R^1$ is a $C_1$–$C_5$ alkyl group or an allyl group.

On the other hand, dyes of the following formula (2), (3), (4) and (5) are excellent in the color rendering properties, but they are inferior in brilliancy, and their pH dependency is somewhat inferior to the monoazo dye of the formula (1). Further, their build up properties are inadequate in the field of dyeing with a medium to deep color and required to be improved.

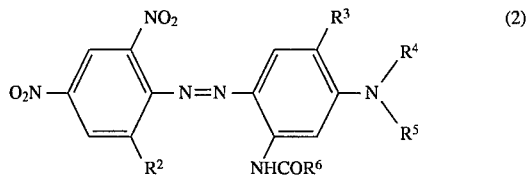
(2)

wherein $R^2$ is a halogen atom, $R^3$ is a hydrogen atom, a methoxy group, an ethoxy group or a $C_1$–$C_3$ alkoxy $C_2$ or $C_3$ alkoxy group, $R^4$ is a hydrogen atom, a $C_1$–$C_5$ alkyl group or an allyl group, $R^5$ is a $C_1$–$C_5$ alkyl group or an allyl group, and $R^6$ is a $C_1$–$C_5$ alkyl group.

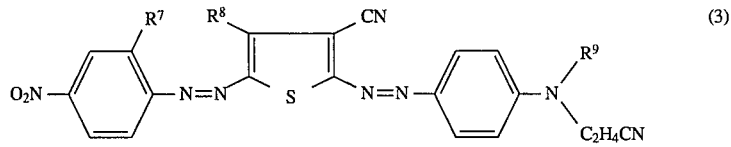
(3)

wherein $R^7$ is a hydrogen atom or a halogen atom, $R^8$ is a hydrogen atom, a methyl group, an ethyl group or a halogen atom, and $R^9$ is a $C_1$–$C_5$ alkyl group.

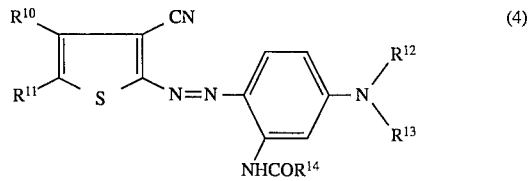
(4)

wherein $R^{10}$ is a hydrogen atom or a halogen atom, $R^{11}$ is a nitro group or a formyl group, each of $R^{12}$ and $R^{13}$ which are independent of each other, is a $C_1$–$C_5$ alkyl group, and $R^{14}$ is a $C_1$–$C_5$ alkyl group, a $C_1$–$C_3$ alkoxymethyl group or a $C_1$–$C_3$ alkoxy $C_2$ or $C_3$ alkoxymethyl group.

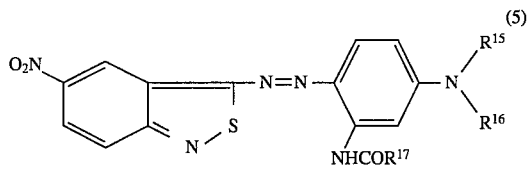
(5)

wherein each of $R^{15}$ and $R^{16}$ which are independent of each other, is a $C_1$–$C_5$ alkyl group or a $C_1$–$C_3$ alkoxy $C_2$ or $C_3$ alkyl group, and $R^{17}$ is a $C_1$–$C_5$ alkyl group.

The present inventors have conducted extensive studies with an object to develop a blue disperse dye which is excellent in the pH dependency and has good color rendering and build up properties, while paying an attention to the above dyes of the formula (1), (2), (3), (4) and (5). As a result, the present invention has been accomplished.

The present invention provides a blue disperse dye mixture comprising 1 part by weight of a monoazo dye of the following formula (1) and from 0.1 to 1.5 parts by weight of at least one azo dye selected from the group consisting of dyes of the following formulas (2), (3), (4) and (5):

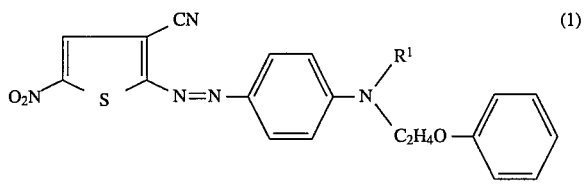
(1)

wherein $R^1$ is a $C_1$–$C_5$ alkyl group or an allyl group,

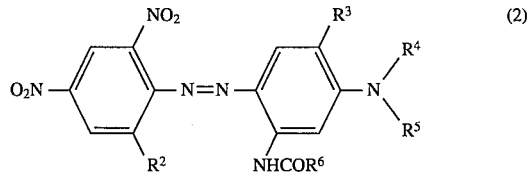
(2)

-continued wherein $R^2$ is a halogen atom, $R^3$ is a hydrogen atom, a methoxy group, an ethoxy group or a $C_1$–$C_3$ alkoxy $C_2$ or $C_3$ alkoxy group, $R^4$ is a hydrogen atom, a $C_1$–$C_5$ alkyl group or an allyl group, $R^5$ is a $C_1$–$C_5$ alkyl group or an allyl group, and $R^6$ is a $C_1$–$C_5$ alkyl group,

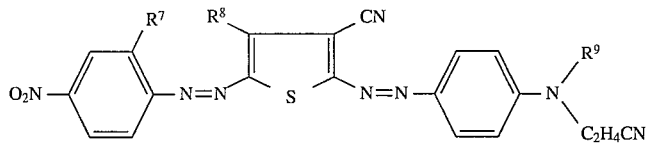

wherein $R^7$ is a hydrogen atom or a halogen atom, $R^8$ is a hydrogen atom, a methyl group, an ethyl group or a halogen atom, and $R^9$ is a $C_1$–$C_5$ alkyl group,

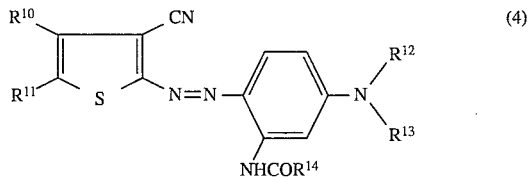

wherein $R^{10}$ is a hydrogen atom or a halogen atom, $R^{11}$ is a nitro group or a formyl group, each of $R^{12}$ and $R^{13}$ which are independent of each other, is a $C_1$–$C_5$ alkyl group, and $R^{14}$ is a $C_1$–$C_5$ alkyl group, a $C_1$–$C_3$ alkoxymethyl group or a $C_1$–$C_3$ alkoxy $C_2$ or $C_3$ alkoxymethyl group,

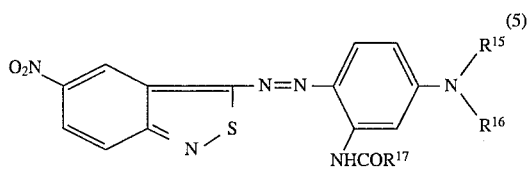

wherein each of $R^{15}$ and $R^{16}$ which are independent of each other is a $C_1$–$C_5$ alkyl group, a $C_1$–$C_3$ alkoxy $C_2$ or $C_3$ alkyl group, and $R^{17}$ is a $C_1$–$C_5$ alkyl group.

Now, the present invention will be described in detail with reference to the preferred embodiments.

In the above formulas (1), (2), (3), (4) and (5), the $C_1$–$C_5$ alkyl group for each of $R^1$, $R^4$, $R^5$, $R^6$, $R^9$, $R^{12}$, $R^{13}$, $R^{14}$, $R^{15}$, $R^{16}$ and $R^{17}$, may be a straight chain or branched chain alkyl group. For each of $R^1$, $R^4$, $R^5$, $R^9$, $R^{12}$ and $R^{13}$, a $C_2$–$C_4$ (straight chain) alkyl group is preferred. For each of $R^6$ and $R^{14}$, a methyl group or an ethyl group is preferred. Likewise, for $R^{17}$, a methyl group is preferred.

The halogen atom for each of $R^2$, $R^7$, $R^8$ and $R^{10}$ is preferably a chlorine atom or a bromine atom.

The $C_1$–$C_3$ alkoxy $C_2$ or $C_3$ alkoxy group for $R^3$ may, for example, be a methoxyethoxy group, a methoxypropoxy group, an ethoxyethoxy group, an ethoxypropoxy group, a propoxyethoxy group or an (i)propoxy(n)propoxy group.

The $C_1$–$C_3$ alkoxymethyl group or the $C_1$–$C_3$ alkoxy $C_2$ or $C_3$ alkoxymethyl group for $R^{14}$ may, for example, be a methoxymethyl group, an ethoxymethyl group, a propoxymethyl group, a methoxyethoxymethyl group, a methoxypropoxymethyl group, an ethoxyethoxymethyl group, an ethoxypropoxymethyl group, an (i)propoxyethoxymethyl group or a propoxypropoxymethyl group. Particularly preferred is a methoxymethyl group or an ethoxymethyl group.

The $C_1$–$C_3$ alkoxy $C_2$ or $C_3$ alkyl group for each of $R^{15}$ and $R^{16}$ may, for example, be a methoxyethyl group, an ethoxyethyl group, an ethoxypropyl group or an (i)propoxypropyl group. Particularly preferred is a methoxyethyl group or an ethoxyethyl group.

The blend ratio of the dyes of the formulas (1), (2), (3), (4) and (5) is such that at least one azo dye selected from the group consisting of dyes of the formulas (2), (3), (4) and (5) is from 0.1 to 1.5 parts by weight, preferably from 0.3 to 1.0 part by weight, relative to 1 part by weight of the monoazo dye of the formula (1). When two or more dyes of the formulas (2), (3), (4) and (5) are used, the ratio of one of them to the rest is usually from 1:0.1 to 1:3, preferably from 1:0.5 to 1:2.

The dyes of the formulas (1) to (5) can be prepared by known methods.

The dye mixture of the present invention is capable of dyeing polyester fibers made of e.g. polyethylene terephthalate, polybutylene terephthalate or a polycondensation product of terephthalic acid with 1,4-bis-(hydroxymethyl) cyclohexane, with a blue color with an excellent leveling property and reproducibility. The object to be dyed may be in the form of yarns, knitted fabrics or woven fabrics made of polyester fibers or a mixed fiber product with other fibers such as cotton, silk, wool, rayon, polyamide, polyurethane, etc.

The dyes of the formulas (1), (2), (3), (4) and (5) are insoluble or hardly soluble in water. Accordingly, to dye polyester fibers with the dye mixture of the present invention, the dye mixture may be dispersed in an aqueous medium by using, as a dispersant, a condensation product of naphthalene sulfonic acid with formaldehyde, a higher alcohol sulfuric acid ester or a higher alkylbenzene sulfonate to obtain a dyeing bath or a printing paste in accordance with a conventional method, and the fibers can be dyed by dip dyeing or printing.

For example, in the case of dip dyeing, polyester fibers or fiber mixture products thereof can be dyed with good color fastness by common dyeing methods, such as a high temperature dyeing method or a thermosol dyeing method. In such a case, it is sometimes possible to obtain better results by an addition of a known acidic substance such as formic acid, acetic acid, phosphoric acid or ammonium sulfate to the dyeing bath. Further, it is usually preferred to adjust the pH of the dyeing bath within a range of from 4.0 to 8.5. The dyeing temperature may, for example, be at a level of from 120° to 140° C.

The disperse dye mixture of the present invention exhibits particularly excellent dyeing properties and temperature dependency when they are applied to dip dyeing. Dyeing conditions in the dip dyeing are not particularly limited. For example, the dyeing temperature may be at a level of from 120° to 140° C., and the dyeing time may be at a level of from 30 to 60 minutes. The pH of the dyeing bath may be at a level of from 4.0 to 8.5. Further, for the purpose of adjusting the shade of the dyed product, other blue disperse dyes may be incorporated in an amount of up to about 10 wt % without impairing the excellent properties of the disperse dye mixture of the present invention. Furthermore, in order to obtain the desired color, a yellow dye or a red dye may be incorporated. Further, various leveling agents or ultraviolet absorbers may be incorporated.

Now, the present invention will be described in further detail with reference to Examples. However, it should be understood that the present invention is by no means restricted by such specific Examples.

EXAMPLE 1

150 g of a lignin sulfonic acid-formalin condensation product and 650 g of water were mixed to a blue disperse dye mixture comprising 35 g of a dye of the following formula (1—1) and 15 g of a dye of the following formula (2-1):

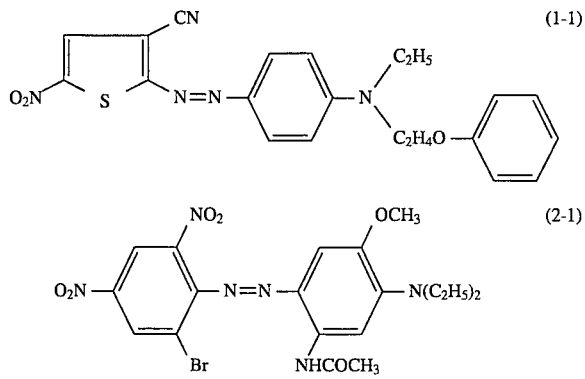

The mixture was subjected to colloid milling by a sand grinder and spray-dried. To each of 0.05 g and 0.25 g of this powdery dispersed dye mixture, 0.08 g of a nonionic leveling agent (Diaserver® LP-PSL, manufactured by Mitsubishi Chemical Corporation) and 150 ml of water were added to obtain a dyeing bath. After adjusting the pH to 4.5 and 7.5, respectively, with an acetic acid/sodium acetate system or a potassium dihydrogenphosphate/disodium hydrogenphosphate system, 5 g of a polyester cloth was immersed, and exhaustion dyeing was carried out at 130° C. and 120° C. for one hour, followed by soaping, washing with water and drying to obtain a dyed product of a relatively brilliant blue.

With respect to the dyed cloth, the pH dependency, the build up property, the temperature dependency and the color rendering property were evaluated in accordance with the following methods. The results are shown in Table 1.

pH Dependency

The dyed color density of the dyed cloth which was dyed at 130° C. for 60 minutes at pH 4.5 by using 0.05 g of the dye mixture, was rated to be 100, and the dyed color density of the dyed cloth which was dyed at pH 7.5 under the same condition was represented by a relative value. The dyed color density was obtained as a K/S value from the reflectance of the dyed product measured by a color difference meter (Macbeth® Spectrometer, MS-2020).

Build Up Property

The dyed color density of the dyed cloth which was dyed at 130° C. for 60 minutes by using 0.05 g of the dye mixture, was rated to be 100. Whereas, the dyed color density of the dyed cloth which was dyed under the same conditions by using 0.25 g of the dye mixture was represented by a relative value.

Temperature Dependency

The dyed color density of the dyed cloth which was dyed at 130° C. for 60 minutes at pH 4.5 by using 0.25 g of the dye mixture, was rated to be 100, and the dyed color density of the dyed cloth which was dyed at 120° C. for 60 minutes under the same condition was represented by a relative value.

Color Rendering Property

Using as a standard the shade observed under standard light source A of the dyed cloth which was dyed at 130° C. for 60 minutes at pH 4.5 by using 0.25 g of the dye mixture, the difference of the shade observed under standard light source C was visually evaluated.

COMPARATIVE EXAMPLE 1

Dyeing was carried out in the same manner as in Example 1 except that in Example 1, the amount of the dye of the formula (1—1) was changed from 35 g to 50 g, and the dye of the formula (2-1) was not used. The results are shown in Table 1.

COMPARATIVE EXAMPLE 2

Dyeing was carried out in the same manner as in Example 1 except that in Example 1, the amount of the dye of the formula (2-1) was changed from 15 g to 50 g, and the dye of the formula (1—1) was not used. The results are shown in Table 1.

EXAMPLES 2 and 3

Dyeing was carried out in the same manner as in Example 1 except that in Example 1, the amounts of the dyes (1—1) and (2-1) were changed as shown in Table 1. The results are shown in Table 1.

TABLE 1

|  | Dyes (blend proportions by weight) | | *1 pH dependency | *2 Build up | *3 Temperature | *4 Color rendering |
| --- | --- | --- | --- | --- | --- | --- |
|  | (1-1) | (2-1) | pH 7.5/pH 4.5 | property | dependency | property |
| Example 1 | 35 | 15 | 100 | 470 | 95 | Almost the same hue. |
| Example 2 | 28 | 22 | 100 | 475 | 98 | Almost the same hue |
| Example 3 | 43 | 7 | 100 | 430 | 85 | Slight change to |

TABLE 1-continued

| | Dyes (blend proportions by weight) | | *1 pH dependency | *2 Build up | *3 Temperature | *4 Color rendering |
|---|---|---|---|---|---|---|
| | (1-1) | (2-1) | pH 7.5/pH 4.5 | property | dependency | property |
| Comparative Example 1 | 50 | — | 100 | 380 | 70 | red Remarkable change to red |
| Comparative Example 2 | — | 50 | 95 | 370 | 65 | Slight change to green |

The ideal value for *1 is 100, that for *2 is 500, and that for *3 is 100. For *4, the same hue is ideal.

EXAMPLES 4 to 26

Dyeing was carried out in the same manner as in Example 1 using a dye mixture comprising 35 parts by weight of a dye (dye (A)) identified in Table 2 as a dye of the formula (1) and 15 parts by weight of a dye or dye mixture (dye (B)) identified as dyes of the formulas (2), (3), (4) and (5). In each Example, the results of evaluation of the obtained dyed cloth were excellent as shown below.

pH dependency: 100

Build up property: at least 430

Temperature dependency: at least 85

Color rendering property: substantially the same shade or very slight change to red.

TABLE 2

| Example | Dye (A) | Dye (B) |
|---|---|---|
| 4 | [structure] | [structure] |
| 5 | " | (a), (b) structures; (a):(b) = 1:1 |
| 6 | " | [structure] |
| 7 | [structure] | [structure] |

TABLE 2-continued

| Example | Dye (A) | Dye (B) |
|---|---|---|
| 8 | (structure with CN, S, NO₂, N(C₂H₅)(C₂H₄O-phenyl) on phenyl-N=N group) | 2,4-dinitro-6-iodophenyl-N=N-(5-ethoxy-4-N(C₃H₇)₂-2-NHCOC₂H₅)phenyl |
| 9 | " | 2,4-dinitro-6-chlorophenyl-N=N-(5-methoxy-4-N(CH₂CH=CH₂)₂-2-NHCOC₃H₇)phenyl |
| 10 | " | (thiophene-based azo dye with CN, CH₃, Cl, 2-chloro-4-nitrophenyl and 4-N(C₃H₇)(C₂H₄CN)phenyl groups) |
| 11 | " | (thiophene-based azo dye with CN, Cl, 4-nitrophenyl and 4-N(C₂H₅)(C₂H₄CN)phenyl groups) |
| 12 | " | 2,4-dinitro-6-chlorophenyl-N=N-(5-methoxy-4-N(C₂H₅)(H)-2-NHCOCH₃)phenyl (c) |

TABLE 2-continued

| Example | Dye (A) | Dye (B) |
|---------|---------|---------|
| 13 | CN-thiophene-N=N-phenyl-N(C2H5)(C2H4OC6H5), O2N on thiophene | (d) O2N, Cl, OCH3, N(C2H5)2, NHCOCH3 phenyl-azo-phenyl |
| 14 | " | (c):(d) = 1:2; CN-thiophene(O2N)-N=N-phenyl-N(C2H5)2, NHCOCH3; and CN-thiophene(O2N)-N=N-phenyl-N(C3H7)2, NHCOCH3, 1:1 |
| 15 | CN-thiophene-N=N-phenyl-N(C2H5)(C2H4OC6H5), O2N on thiophene | (g) Br,OHC-thiophene-N=N-phenyl-N(C2H5)2, NHCOCH2OCH3; and O2N,Cl-phenyl-N=N-phenyl-OCH3,N(C2H5)2,NHCOCH3 |

TABLE 2-continued

| Example | Dye (A) | Dye (B) |
|---|---|---|
| 16 | | (g):(h) = 2:1 structures shown |
| 17 | thiophene-azo-aniline dye | thiophene-azo-aniline dye |
| 18 | thiophene-azo-aniline dye | nitro-bromo-phenyl azo dye |
| 19 | thiophene-azo-aniline dye | nitro-bromo-phenyl azo dye |

TABLE 2-continued

| Example | Dye (A) | Dye (B) |
|---|---|---|
| 20 | thiophene-based azo dye with CN, O₂N on thiophene, linked N=N to phenyl-N(C₃H₇(n))(C₂H₄OC₆H₅) | azo dye: O₂N, NO₂-phenyl-N=N linked to phenyl with OCH₃, N(C₂H₅)₂, NHCOCH₃, Cl substituents |
| 21 | thiophene-based azo dye with CN, O₂N on thiophene, linked N=N to phenyl-N(C₃H₇(n))(C₂H₄OC₆H₅) | bis-azo thiophene dye with CN, S, two N=N linkages to 4-nitrophenyl and 4-N(C₂H₅)(C₂H₄CN)phenyl (i) + same with C₄H₉ in place of C₂H₅ (j); (i):(j) = 1:1 |
| 22 | thiophene-based azo dye with CN, O₂N on thiophene, linked N=N to phenyl-N(C₄H₉(n))(C₂H₄OC₆H₅) | azo dye: O₂N, NO₂-phenyl (with Br)-N=N linked to phenyl with OC₂H₅, N(C₂H₅)₂, NHCOC₅H₁₁ |
| 23 | " | bis-azo thiophene dye with CN, S, two N=N linkages to 4-nitrophenyl and 4-N(C₅H₁₁)(C₂H₄CN)phenyl |

TABLE 2-continued

| Example | Dye (A) | Dye (B) |
|---|---|---|
| 24 | 3-CN-2-(4-(N-ethyl-N-phenoxyethyl)aminophenylazo)-5-nitrothiophene | 4-nitrophenyl azo — 4-N(C₂H₄OCH₃)₂, 2-NHCOCH₃ aniline |
| 25 | " | (k) 4-nitrophenyl azo — 4-N(C₂H₄OC₂H₅)₂, 2-NHCOCH₃ aniline<br>(l) 2-NO₂-6-Cl-4-nitrophenyl azo — 5-OCH₃, 4-N(C₂H₅)₂, 2-NHCOCH₃<br>(K):(l) = 1:1 |
| 26 | 3-CN-2-(4-(N-methyl-N-phenoxyethyl)aminophenylazo)-5-nitrothiophene | 4-nitrophenyl azo — 4-N(C₄H₆OC₂H₅)₂, 2-NHCOC₄H₉(n) aniline |

The blue disperse dye mixture of the present invention is excellent in the pH dependency, the build up property and the temperature dependency and has a good color rendering property.

What is claimed is:

1. A blue disperse dye mixture comprising 1 part by weight of a monoazo dye of the following formula (1) and from 0.1 to 1.5 parts by weight of at least one azo dye selected from the group consisting of dyes of the following formulas (2), (3), (4) and (5):

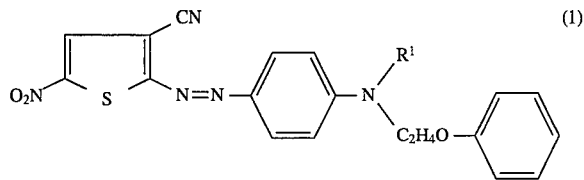

wherein $R^1$ is a $C_1-C_5$ alkyl group or an allyl group,

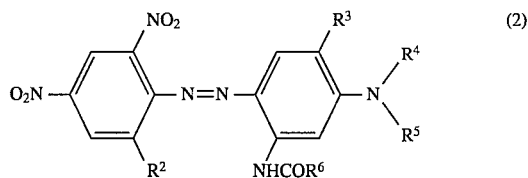

wherein $R^2$ is a halogen atom, $R^3$ is a hydrogen atom, a methoxy group, an ethoxy group or a $C_1-C_3$ alkoxy $C_2$ or $C_3$ alkoxy group, $R^4$ is a hydrogen atom, a $C_1-C_5$ alkyl group or an allyl group, $R^5$ is a $C_1-C_5$ alkyl group or an allyl group, and $R^6$ is a $C_1-C_5$ alkyl group,

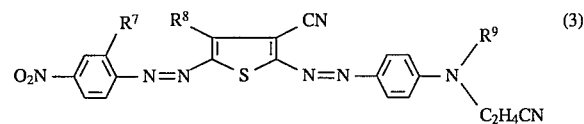

wherein $R^7$ is a hydrogen atom or a halogen atom, $R^8$ is a hydrogen atom, a methyl group, an ethyl group or a halogen atom, and $R^9$ is a $C_1-C_5$ alkyl group,

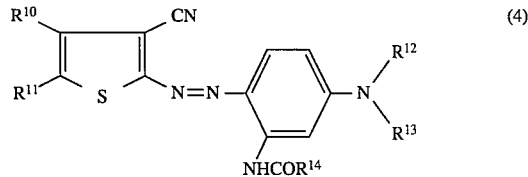

wherein $R^{10}$ is a hydrogen atom or a halogen atom, $R^{11}$ is a nitro group or a formyl group, each of $R^{12}$ and $R^{13}$ which are independent of each other, is a $C_1-C_5$ alkyl group, and $R^{14}$ is a $C_1-C_5$ alkyl group, a $C_1-C_3$ alkoxymethyl group or a $C_1-C_3$ alkoxy $C_2$ or $C_3$ alkoxymethyl group,

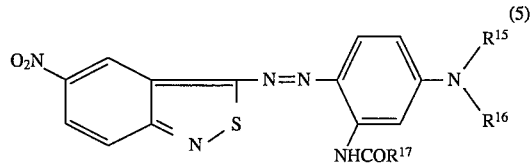

wherein each of $R^{15}$ and $R^{16}$ which are independent of each other is a $C_1-C_5$ alkyl group, a $C_1-C_3$ alkoxy $C_2$ or $C_3$ alkyl group, and $R^{17}$ is a $C_1-C_5$ alkyl group.

2. The blue disperse dye mixture according to claim 1, wherein in the formula (1), $R^1$ is a $C_2-C_4$ alkyl group; in the formula (2), $R^2$ is a chlorine atom or a bromine atom, $R^3$ is a methoxy group or an ethoxy group, each of $R^4$ and $R^5$ is a $C_2-C_4$ alkyl group, and $R^6$ is a methyl group or an ethyl group; in the formula (3), each of $R^7$ and $R^8$ is a hydrogen atom, $R^9$ is a $C_2-C_4$ alkyl group; in the formula (4), each of $R^{12}$ and $R^{13}$ is a $C_2-C_4$ alkyl group, and $R^{14}$ is a methyl group, an ethyl group, a methoxymethyl group or an ethoxymethyl group; and in the formula (5), each of $R^{15}$ and $R^{16}$ is a methoxyethyl group or an ethoxyethyl group, and $R^{17}$ is a methyl group.

3. The blue disperse dye mixture according to claim 1, which comprises 1 part by weight of the monoazo dye of the formula (1) and from 0.3 to 1.0 part by weight of at least one azo dye selected from the group consisting of the dyes of the formulas (2), (3), (4) and (5).

4. The blue disperse dye mixture according to claim 1, which comprises 1 part by weight of the monoazo dye of the formula (1) and from 0.3 to 1.0 part by weight of the dye of the formula (2).

5. A method of dyeing wherein a blue disperse dye mixture as defined in claim 1 is applied to polyester-containing fibers.

* * * * *